No. 759,797. PATENTED MAY 10, 1904.
J. C. BARCLAY.
RHEOSTAT.
APPLICATION FILED NOV. 18, 1903.
NO MODEL.
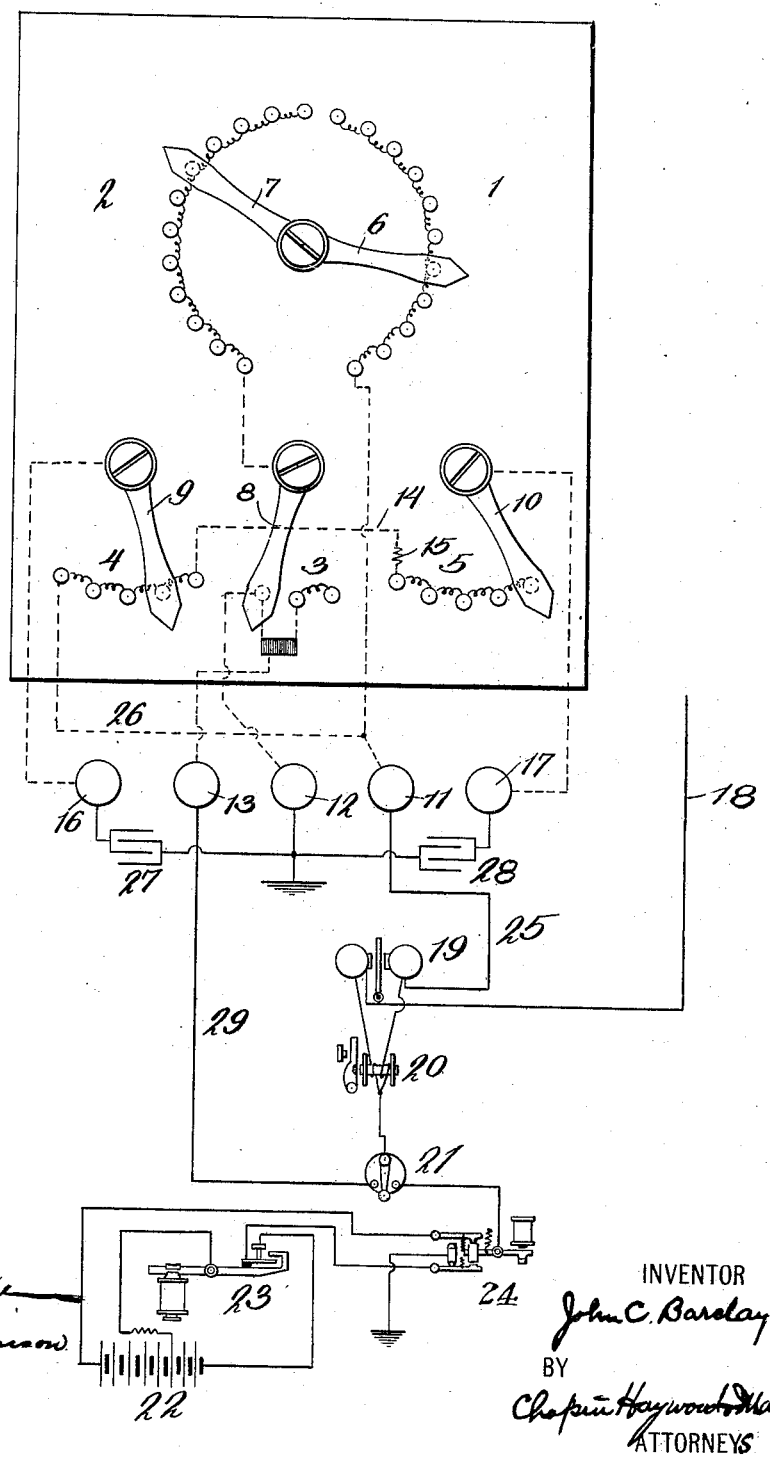
WITNESSES:
INVENTOR
John C. Barclay
BY
ATTORNEYS No. 759,797. Patented May 10, 1904.

UNITED STATES PATENT OFFICE.

JOHN C. BARCLAY, OF NEW YORK, N. Y.

RHEOSTAT.

SPECIFICATION forming part of Letters Patent No. 759,797, dated May 10, 1904.

Original application filed September 9, 1903, Serial No. 172,477. Divided and this application filed November 18, 1903. Serial No. 181,594. (No model.)

*To all whom it may concern:*

Be it known that I, JOHN C. BARCLAY, a citizen of the United States, residing at New York, in the county of New York and State of New York, have invented certain new and useful Improvements in Rheostats; and I do hereby declare the following to be a full, clear, and exact description of the invention, such as will enable others skilled in the art to which it appertains to make and use the same.

My invention relates to improvements in rheostats such as are employed in connection with duplex and quadruplex telegraph systems; and it consists in employing a portion of the resistance of such rheostat normally included in the artificial line for compensating for battery resistance when balancing the system. By so doing I avoid the use of a separate rheostat for the purpose, which, except when the line is being balanced, is useless.

The object of my invention is to avoid the use of a separate resistance for compensating for battery during the balancing of the line.

I will now proceed to describe my invention with reference to the accompanying drawing, which is a diagram showing one form of my improved rheostat with its switches, resistances, and binding-posts, together with the instruments and circuits at one end of a quadruplex system, and will then point out the novel features in claims.

In the said drawing numeral 1 designates the rheostat, which comprises five series of contact-buttons 1, 2, 3, 4, and 5, with corresponding switch-arms 6, 7, 8, 9, and 10, and suitable resistance-coils connecting the contact-buttons of each series, so that by movement of the switch-arms from one button to another the resistance in circuit may be increased or decreased at will. The contact-buttons of series 1 and 2 are arranged in semicircles, their contact-arms 6 and 7 having a common axis and being electrically connected.

Customarily I make the resistance of each coil of series 2 equal to the combined resistance of all the coils of series 1 and make the resistance of each coil of series 1 a convenient factor of the resistance of a single coil of series 2. By this arrangement it is easy to vary the resistance in circuit through a wide range and with relatively small increments. Customarily the coils of series 1 are each of twenty-five ohms resistance and those of series 2 of two hundred and fifty ohms; but it will be understood that the coils of both series may have any resistance desired.

The first contact-button of series 1 is connected to a binding-post 11, forming one artificial-line terminal of the rheostat, and the first contact-button of series 2 is connected to switch-arm 8 of series 3. The resistance-coils of series 3 are of much higher resistance than those of series 1 and 2, the first coil of the series being customarily of two thousand seven hundred ohms resistance and the second coil of two thousand three hundred ohms. The first contact-button of this series is connected to a binding-post 12, forming the second or ground artificial-line terminal of the rheostat. The first resistance-coil of series 3 is further provided at an intermediate point with a conductor leading to a binding-post 13. The point of connection of the said conductor to the said resistance-coil is such as to divide this coil into two sections, which in practice are of six hundred and two thousand one hundred ohms resistance, respectively. The short end of this coil—namely, that having the less resistance—is used for compensating for battery resistance when balancing the system, being a standard of battery resistance; but of course this standard may be greater or less, if preferred.

The contact-buttons of series 4 and 5 are connected in series by a conductor 14, in which is a further resistance 15. The coils of series 4 are customarily of one hundred ohms resistance each and those of series 5 of two hundred ohms resistance each, the resistance 15 being also two hundred ohms. Contact-arm 9 of series 4 is connected to binding-post 16, and contact-arm 10 of series 5 is connected to binding-post 17.

In the drawing, 18 designates the line conductor of the system; 19, the line polar relay; 20, the line neutral relay; 21, a two-point switch having a base of insulating material controlling the connection of the line to the battery 22. 23 and 24 are the two transmitters, and 25 is the artificial line connected to a binding-post 11 of the rheostat. From said binding-post the artificial-line circuit passes through switch-arms 6 and 7 and such resistance-coils of series 1 and 2 as are in circuit, according to the adjustment of said switch-arms, and through switch-arm 8 and one or both of the resistance-coils of series 3 to binding-post 12 and thence to ground. A branch of this artificial-line circuit passes through a conductor 26, through one or more of the resistances of switch 9 to binding-post 16, and thence through a condenser 27 to ground. A further branch of this circuit comprises conductor 14, one or more of the resistance-coils of series 5, switch-arm 10, binding-post 17, and a second condenser 28.

One of the contact-points of battery-switch 21 is connected by a conductor 29 to that binding-post 13 which is connected to an intermediate point of the first resistance-coil of series 3. This circuit and the short end of the resistance-coil are employed when balancing the circuit. At such times the line is connected to ground through switch 21, binding-post 13, the resistance of the first portion of the resistance-coil, and binding-post 12, the six hundred ohms resistance thereby included in the line being included therein to balance the resistance of the battery normally in circuit. Heretofore it has been customary to employ a separate rheostat for this purpose, which is not used except when balancing the circuit, and therefore complicates the system and increases the expense of the apparatus unnecessarily. The use of such separate rheostat I avoid by employing for the purpose a portion of the resistance of the artificial-line circuit, which artificial-line resistance is not otherwise in use when the line is being balanced.

What I claim is—

1. In a telegraph-rheostat, the combination with variable resistance adapted for inclusion in an artificial line, and terminals therefor, of a separate terminal connected to an intermediate point in such resistance, and adapted for connection to a main line to compensate for battery resistance.

2. The combination, with main and artificial line circuits of a telegraph system, and a battery, of a rheostat having resistance included in the artificial line, and having also a separate terminal connected to an intermediate point in such resistance, and a switch connected to such separate terminal, to the main line, and to the battery, arranged to connect said main line to the battery or through a portion only of said artificial-line resistance to ground, at will.

In testimony whereof I affix my signature in the presence of two witnesses.

JOHN C. BARCLAY.

Witnesses:
C. A. VAN BRUNT,
H. M. MARBLE.